May 2, 1961   G. KUBERA   2,982,011
CLOSING MEMBER FOR HOLLOW VALVE CONES
Filed June 18, 1956
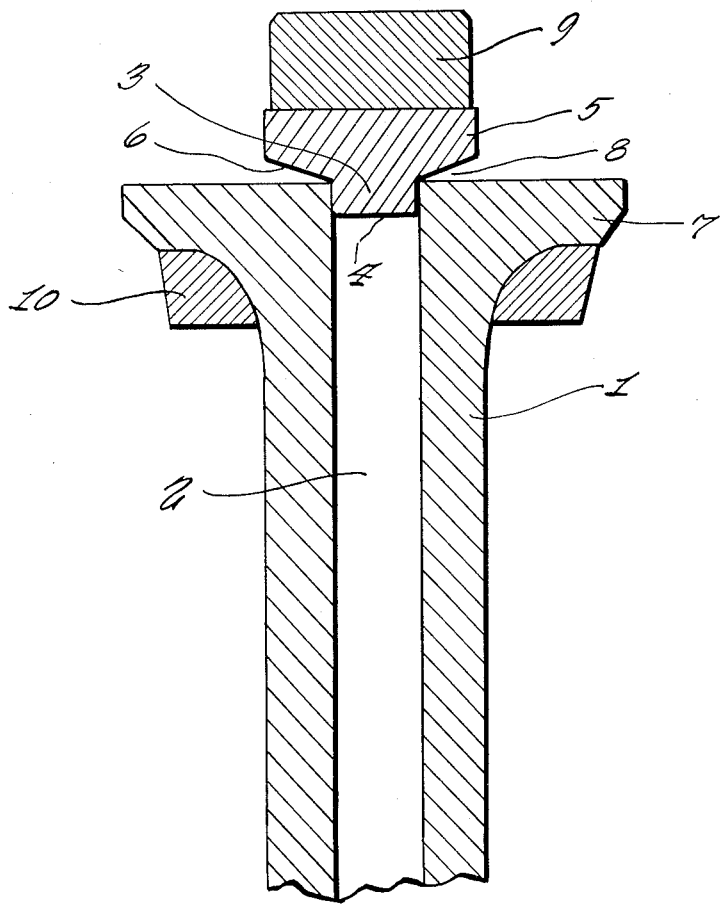
INVENTOR.
GERHARD KUBERA United States Patent Office 2,982,011
Patented May 2, 1961

2,982,011
CLOSING MEMBER FOR HOLLOW VALVE CONES

Gerhard Kubera, Blumberg, Baden, Germany, assignor to Alfred Teves Maschinen- und Armaturenfabrik K.G., Frankfurt am Main, Germany Filed June 18, 1956, Ser. No. 592,122

Claims priority, application Germany June 23, 1955

2 Claims. (Cl. 29—156.7)

The present invention relates to a closing member to be used for bores in hollow valve cones, particularly those used in combustion engines.

It is known to close the bores of valve cones by providing a stopper with fitted seating surface, and welding the same at its upper end to the valve disc. This has the disadvantage that the stopper has to be of considerable length in order to guarantee a tight seal of the bore. This, however, involves the drawback that the cooling liquid cannot flow sufficiently far into the valve head and the cooling is therefore not satisfactory. It is a further inconvenience that, due to the shrinkage of the stopper upon cooling, a space is formed between the stopper and the valve disc which prevents proper heat transfer between the stopper and the disc.

It is the object of the present invention to provide improved closing means which permit the elimination of the above mentioned drawback.

This is accomplished by providing a closing member which is joined to the valve by pressure welding. The member consists of a stopper having a cylindrical upper part of larger diameter and a projection at the bottom which is of equal diameter with the valve bore. The cylindrical part is joined to the bottom projection by a frustoconical surface. Due to this design, the space which is formed after the stopper has been placed into the bore, is likewise of frustoconical shape and the material displaced during pressure welding can flow off through this space. The closing member is self-centering when the stopper is placed into the bore of the valve cone. This prevents a faulty placement of the stopper, due to the action of the compression force.

The design of the stopper according to the invention makes it dispensable to provide a closing member extending deeply into the valve cone and the heat dispersion is thereby considerably improved. It is another advantage that the penetration of the melt into the bore is prevented which cannot be done when a simple plate is used for closing the bore.

The invention will now be more fully described with reference to the accompanying drawing, but it should be understood that this is given by way of illustration and not of limitation, and that many changes in the details can be made without departing from the spirit of the invention.

The drawing shows the device according to the invention in longitudinal section. The valve cone is designated by 1; it has a bore 2 starting from the valve disc down. The stopper 3 has an upper cylindrical portion 5 with a projection 4 at the bottom which is of the same diameter as is bore 2; the upper part 5 of the stopper merges into the projection 4 by means of a frustoconical surface 6. In the space formed at 8 between the upper portion 5 of the stopper and the valve head 7, when the projection 4 is placed into the bore 2, material which is displaced by pressure welding will flow off to the outside. The electrodes necessary for pressure welding are shown at 9 and 10.

What I claim is:

1. The method of forming a closing member and sealing with said closing member a valve provided with a coolant-filled cylindrical valve bore and having a flat upper face, comprising forming the closing member with a lower cylindrical part of a diameter equal to that of the valve bore, extending the lower part into a frusto-conical, upwardly diverging part terminating in an upper cylindrical part of a larger diameter than that of the lower part, inserting the lower part of the cylindrical closing member into the cylindrical valve bore, to thereby form an annular space between the frusto-conical part and the valve's upper face, pressure-welding the valve and the closing member at the junction of the frusto-conical part and the upper flat face of the valve, to thereby cause the material displaced during the pressure welding to flow only outwardly of the frusto-conical part into the annular space.

2. The method of forming a coolant-filled valve comprising providing a valve stem and cone member formed with an axial cylindrical bore and a flat upper face, forming a closing member with a lower cylindrical part of a diameter equal to that of the valve bore, extending the lower part of said closing member into a frusto-conical upwardly diverging part terminating in an upper cylindrical part of a larger diameter than that of the lower part, inserting the lower part of the cylindrical closing member into the cylindrical bore of the stem and cone member to thereby form an annular space between the frusto-conical part and the valve's upper face, pressure-welding the valve and the closing member at the junction of the frusto-conical part and the upper flat face of the valve, to thereby cause the material displaced during the pressure-welding to flow only outwardly of the frusto-conical part into the annular space.

References Cited in the file of this patent

UNITED STATES PATENTS

| | | |
|---|---|---|
| 1,786,285 | Bissell | Dec. 23, 1930 |
| 2,089,749 | Jardine | Aug. 10, 1937 |
| 2,369,063 | McDill | Feb. 6, 1945 |
| 2,394,177 | Hoern | Feb. 5, 1946 |
| 2,410,190 | Townhill | Oct. 29, 1946 |
| 2,440,461 | Clements | Apr. 27, 1948 |

FOREIGN PATENTS

| | | |
|---|---|---|
| 917,196 | France | Sept. 9, 1946 |